(12) United States Patent
Scheidle et al.

(10) Patent No.: US 9,616,768 B2
(45) Date of Patent: Apr. 11, 2017

(54) ELECTRICAL MACHINE CONTROL METHOD AND APPARATUS

(71) Applicant: Robert Bosch GmbH, Stuttgart (DE)

(72) Inventors: Alexander Scheidle, Stutensee (DE); Martin Wirth, Saint-Ouen (FR)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 14/364,437

(22) PCT Filed: Oct. 5, 2012

(86) PCT No.: PCT/EP2012/069746
§ 371 (c)(1),
(2) Date: Jun. 11, 2014

(87) PCT Pub. No.: WO2013/087246
PCT Pub. Date: Jun. 20, 2013

(65) Prior Publication Data
US 2015/0006006 A1    Jan. 1, 2015

(30) Foreign Application Priority Data
Dec. 13, 2011 (DE) .......... 10 2011 088 460

(51) Int. Cl.
*B60L 9/00* (2006.01)
*B60L 11/00* (2006.01)
(Continued)

(52) U.S. Cl.
CPC ........... *B60L 15/20* (2013.01); *B60L 11/1803* (2013.01); *B60L 15/2045* (2013.01);
(Continued)

(58) Field of Classification Search
USPC ........................................................ 701/22
See application file for complete search history.

(56) References Cited

U.S. PATENT DOCUMENTS

| 2005/0194925 | A1 | 9/2005 | Ito et al. | |
|---|---|---|---|---|
| 2008/0023256 | A1* | 1/2008 | Krieger | B62D 5/0463 180/444 |

(Continued)

FOREIGN PATENT DOCUMENTS

CN    2646383    10/2004

OTHER PUBLICATIONS

International Search Report for Application No. PCT/EP2012/069746 dated Aug. 6, 2013 (English Translation, 3 pages).

(Continued)

*Primary Examiner* — Imran Mustafa
(74) *Attorney, Agent, or Firm* — Michael Best & Friedrich LLP

(57) ABSTRACT

Method for controlling an electrical machine (14), in particular for an electric or hybrid drive train (12) of a motor vehicle (10), wherein the electrical machine (14) can provide a torque (T) both at positive and at negative speeds (n), having the steps of:—using a characteristic curve (M; G) to check whether a torque desired value (72; 74) can or may be provided by the electrical machine (14), wherein the characteristic curve (M; G) represents a limit torque with respect to the speed (n) and has a first section (A1; A4) for positive speeds and a second section (A2; A3) for negative speeds. In this case, the first section (A1; A4) and the second section (A2; A3) are arranged in the same quadrant (I; IV) of the characteristic curve (70).

13 Claims, 3 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60L 15/20* (2006.01)
  *B60L 11/18* (2006.01)
  *H02P 29/032* (2016.01)

(52) U.S. Cl.
  CPC ....... *H02P 29/032* (2016.02); *B60L 2240/421* (2013.01); *B60L 2240/423* (2013.01); *B60L 2240/545* (2013.01); *B60L 2240/547* (2013.01); *B60L 2240/549* (2013.01); *H02P 2205/05* (2013.01); *Y02T 10/645* (2013.01); *Y02T 10/7005* (2013.01); *Y02T 10/7283* (2013.01); *Y10S 903/903* (2013.01)

(56) References Cited

U.S. PATENT DOCUMENTS

| | | | |
|---|---|---|---|
| 2008/0042605 A1 | 2/2008 | Subrata et al. | |
| 2008/0242463 A1* | 10/2008 | Yamada | B60K 6/365 475/5 |
| 2009/0026998 A1 | 1/2009 | Ueno et al. | |
| 2009/0242293 A1* | 10/2009 | Tanaka et al. | 180/65.285 |
| 2011/0213518 A1 | 9/2011 | Welchko et al. | |

OTHER PUBLICATIONS

Ben-Brahim et al., "Practical considerations for sensorless induction motor drive system," Industrial Electronics Society, 1998, IECON '98, Proceedings of the 24th Annual conference of the IEEE Aachen, Germany, Aug. 31, 1998-Sep. 4, 1998, New York, NY, USA, IEEE, US, vol. 2, Aug. 31, 1998, pp. 1002-1007.

* cited by examiner

ELECTRICAL MACHINE CONTROL METHOD AND APPARATUS

BACKGROUND OF THE INVENTION

The present invention relates to a method for controlling an electric machine, in particular for an electric or hybrid drive train of a motor vehicle, wherein the electric machine can provide a torque both at positive and at negative rotation speeds, comprising the step of performing a check with the aid of a characteristic curve as to whether a desired torque value can or may be provided by the electric machine, wherein the characteristic curve represents a limit torque with respect to the rotation speed and has a first section for positive rotation speeds and a second section for negative rotation speeds.

Moreover, the present invention relates to a control device for an electric machine, wherein the control device is designed so as to perform a method of this type. Finally, the present invention relates to a drive train for a motor vehicle having an electric machine and a control device of this type.

It is generally known in the field of motor vehicle drive technology to use an electric machine as a stand-alone drive or in combination with a drive motor of a different type (hybrid drive). In electric or hybrid motor vehicles of this type, typically electric induction machines are used as drive motors. An electronic power system is used in order to control induction machines of this type in a motor vehicle, said electronic power system comprising an AC converter that converts into AC current the DC voltage/DC current of a (high voltage) battery that is located on board the motor vehicle. The AC converter comprises generally a plurality of controllable power switches. The power switches are controlled in a pulse-width modulated manner by means of a control device, so that during the motor mode operation the electric machine generates a particular torque at a particular rotation speed of an output shaft of the electric machine.

When controlling the electric machine, it is necessary to ascertain limit torques in order to calculate the torque strategy, said limit torques providing information regarding the performance of the electric drive.

The electric machine is generally able to provide a torque both at positive and also at negative rotation speeds. This means that during the motor mode operation, the electric machine can also be used by way of example for moving the motor vehicle in the reverse direction. In some cases, the electric machine is also designed so as to operate as a generator. Insofar as this is also possible at positive and negative rotation speeds, this is referred to as a so-called 4-quadrant operation.

In order to guarantee the reliability and availability of the electric machine and/or of the drive train, it is expedient to prevent problems arising when calculating the limit torques. One problem resides in the fact that the motor mode limit torque and the generator mode limit torque are calculated at the zero crossing point of the rotation speed (any change between positive and negative rotation speed). Torque surges occur at the said zero crossing point because for example the generator mode limit torque at negative rotation speeds has a positive value and at positive rotation speeds said limit torque has a negative value. In a corresponding manner, the motor mode limit torque at negative rotation speeds has a negative value and at positive rotation speeds said limit torque has a positive value. The surge at these limits can cause problems within the torque strategy as the rotation speed changes from negative to positive, the reason being that when the rotation speed is zero it is not possible to differentiate between the motor mode operation and the generator mode operation.

On the basis of this background, it is the object of the invention to provide an improved method for controlling an electric machine, to provide an improved control device and also an improved drive train, wherein in particular the reliability and availability are improved.

SUMMARY OF THE INVENTION

The above-mentioned object is achieved by virtue of a method for controlling an electric machine, in particular for an electric or hybrid drive train of a motor vehicle, wherein the electric machine can provide a torque both at positive rotation speeds and also at negative rotation speeds, which method comprises the steps:

performing a check with the aid of a characteristic curve as to whether a desired torque value can or may be provided by the electric machine, wherein the characteristic curve represents a limit torque with respect to the rotation speed and said characteristic curve comprises a first section for positive rotation speeds and a second section for negative rotation speeds, wherein the first section and the second section are arranged in the same quadrant of the characteristic curve.

Moreover, the above-mentioned object is achieved by virtue of a control device for an electric machine, wherein the control device is designed and/or embodied so as to perform the above-mentioned method.

Finally, the above-mentioned object is achieved by virtue of a drive train for a motor vehicle having an electric machine and a control device of the above-mentioned type.

The electric machine can be designed either exclusively as a motor or exclusively as a generator. The provision of a torque at positive and negative rotation speeds consequently means in the present context that the electric machine provides this torque when operating as a motor and consumes said torque when operating as a generator. In a corresponding manner, the characteristic curve can represent a motor mode limit torque when the electric machine is operating as a motor and when the electric machine is operating as a generator said characteristic curve can represent a generator mode limit torque. The motor mode limit torque is arranged in the quadrants I, III in the case of a test method in accordance with the prior art and the generator mode limit torque is arranged in the quadrants II, IV in the prior art.

It is now possible in accordance with the invention to also arrange the section for negative rotation speeds in the quadrant I, said section in the prior art being arranged in the quadrant III, or vice versa. In a corresponding manner, it is possible when the electric machine is operating as a generator to arrange the section of the quadrant II in accordance with the invention in the quadrant IV, or vice versa.

Consequently, it is possible in accordance with the invention to perform a check as to whether a desired torque value can be provided irrespective of the algebraic sign of the rotation speed.

This is extremely important particularly in the case of predicting torque limits and origin point calculations. Owing to the fact that the calculation is not dependent upon the rotation speed and/or the algebraic sign of the rotation speed, it is possible to predict these values so that a greater magnitude of availability of the electric machine and/or of the drive train is achieved. Inconsistencies in the zero point can be avoided in this manner.

If by way of example, the torque limits and/or torque predictions are calculated at the zero crossing point, it is possible in the prior art to misinterpret a limit. By way of example, it is possible in the prior art for the generator mode limit torque to jump from the value in the quadrant II to the value in the quadrant IV, wherein, however, the rotation speed still suggests the quadrant II. As a consequence, the generator mode limit torque would be drawn into the quadrant III, which would mean that only the motor mode torque would be possible. In these cases, the vehicle control would then react incorrectly (for example starting the motor by mistake, although this is not allowed, or charging the battery even though the battery is already fully charged).

It is particularly preferred if a section of the first section and of the second section is mirror-imaged by point mirror-imaging with respect to the origin of the characteristic curve in the quadrants of the other section.

As a consequence, it is possible in a simple and effective manner to arrange the first section and the second section in the same quadrant of the characteristic curve.

Moreover, it is advantageous if the torque is a motor mode torque and if the section for negative rotation speeds is arranged in the quadrant for positive rotation speeds.

In the case of this embodiment, the algebraic sign of the motor mode torque and in particular the algebraic sign of the rotation speed is consequently always positive in the checking step.

In a corresponding manner, it is advantageous if the torque is a generator mode torque and if the section for negative rotation speeds is arranged in the quadrant for positive rotation speeds.

In the case of this embodiment, the algebraic sign of the generator mode torque is consequently always negative in the checking step and in particular the algebraic sign of the rotation speed is always positive.

Overall it is further preferred if the rotation speed is subjected where necessary to an algebraic sign change prior to the checking step.

As a consequence, it is ensured that by way of example in the case of a negative rotation speed of the electric machine it is possible to perform a check in the characteristic curve in the region of positive rotation speeds.

It is also advantageous if, during the procedure of starting up the electric machine from the rotation speed zero, initially the particular section of the characteristic curve that has a lower limit torque in the start-up range is used in the checking procedure.

In general, the first section and the second section that are arranged in the same quadrant of the characteristic curve can be different (since by way of example during the forwards travel of the motor vehicle a greater magnitude of torque may be provided than during the reverse travel or similar of the motor vehicle). During the start-up procedure from the rotation speed zero, generally initially the particular section of the characteristic curve that has a lower limit torque in the start-up range is then used in the checking procedure irrespective of the algebraic sign of the actual rotation speed.

The reliability can be increased as a consequence.

It is preferred that the limit torque is set in dependence upon one or several of the following parameters, including battery current limits, battery voltage limits, temperature of an AC converter, rotation speed, temperature of the electric machine and also replacement diagnostic functions.

The limit torque is consequently included in the torque strategy of the vehicle control. If, for example, the torque prediction indicates that in x seconds it will no longer be possible to provide current for the motor, the combustion engine can be started by way of precaution so that the battery can be charged, so that finally power is once again available for supporting the motor mode operation. This type of torque prediction is also directly associated with the driving strategy.

Moreover, the same parameters are also important for the torque prediction, wherein said parameters are however predicted parameters. In addition, the torque prediction can be supplemented by way of additional parameters such as the predicted temperature, battery currents, degree of efficiency.

It goes without saying that the above-mentioned features and features yet to be explained hereinunder can be used not only in the respective mentioned combination but rather also in other combinations or as stand-alone features without departing from the scope of the present invention.

BRIEF DESCRIPTION OF THE DRAWINGS

Exemplary embodiments of the invention are illustrated in the drawing and are further explained in the description hereinunder.

DETAILED DESCRIPTION

Figure 1:
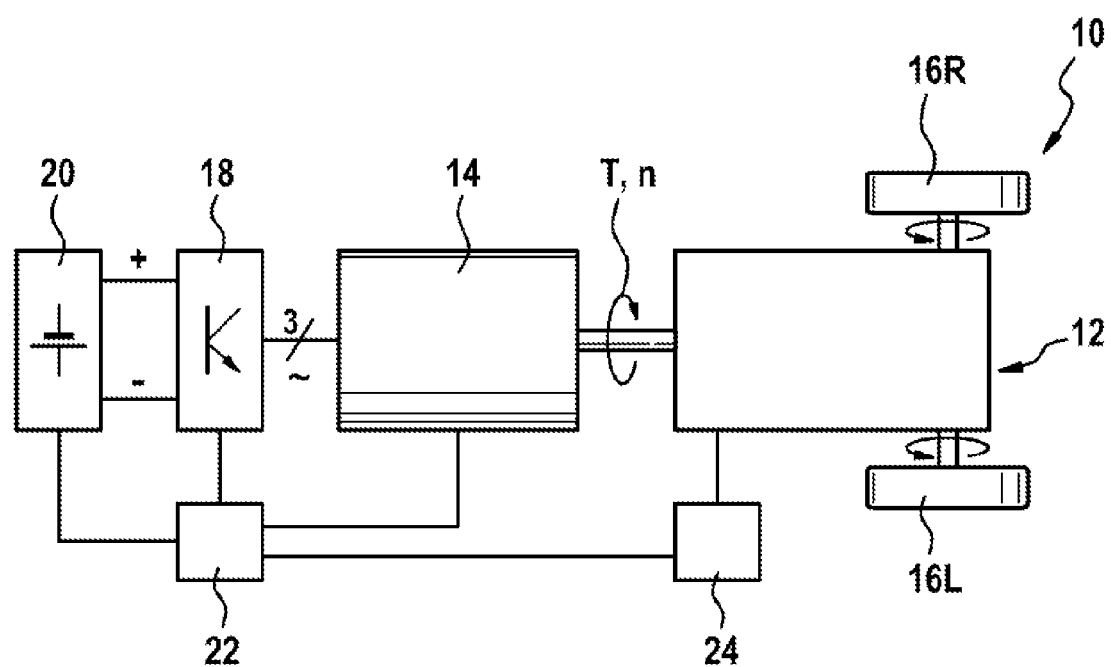
FIG. 1 illustrates schematically a drive train of a motor vehicle having an electric machine.

FIG. 1 illustrates schematically a motor vehicle that is described in general by the numeral 10. The motor vehicle 10 comprises a drive train 12 that in the present case comprises an electric induction machine 14 for providing the driving power. The drive train 12 is used to drive driven wheels 16L, 16R of the vehicle 10.

The electric induction machine 14 provides a torque t to an output shaft and rotates at an adjustable rotation speed.

The drive train 12 can be designed so as to drive the vehicle 10 solely by means of the electric induction machine 14 (electric vehicle). Alternatively, the electric induction machine 14 can be part of a hybrid drive train 12, wherein the drive train 12 can comprise an additional drive motor, not illustrated in detail in FIG. 1, such as a combustion engine or the like. Moreover, the drive train 12 can in this case be a gear mechanism and similar.

The electric induction machine 14 is embodied in a multi-phase manner (in the present case with three phases) and is controlled by means of an electronic power system 18. The electronic power system 18 is connected to an energy supply such as a DC voltage supply (e.g. rechargeable battery) 20 of the vehicle 10 and is used for the purpose of converting DC voltage that is provided by the rechargeable battery 20 into three AC currents for the three phases of the electric induction machine. The electronic power system 18 comprises for this purpose a plurality of power switches and is controlled by means of a control device 22. The control device 22 can moreover be connected to the electric induction machine 14 in order to obtain by way of example actual values of the rotation speed and/or the angular position of a rotor of the electric induction machine 14. Moreover, the control device 22 can be connected to the rechargeable battery 20. Finally, the control device 22 can be connected to a higher-priority or equal-priority control device 24 for the purpose of controlling other components in the drive train 12.

Figure 2:
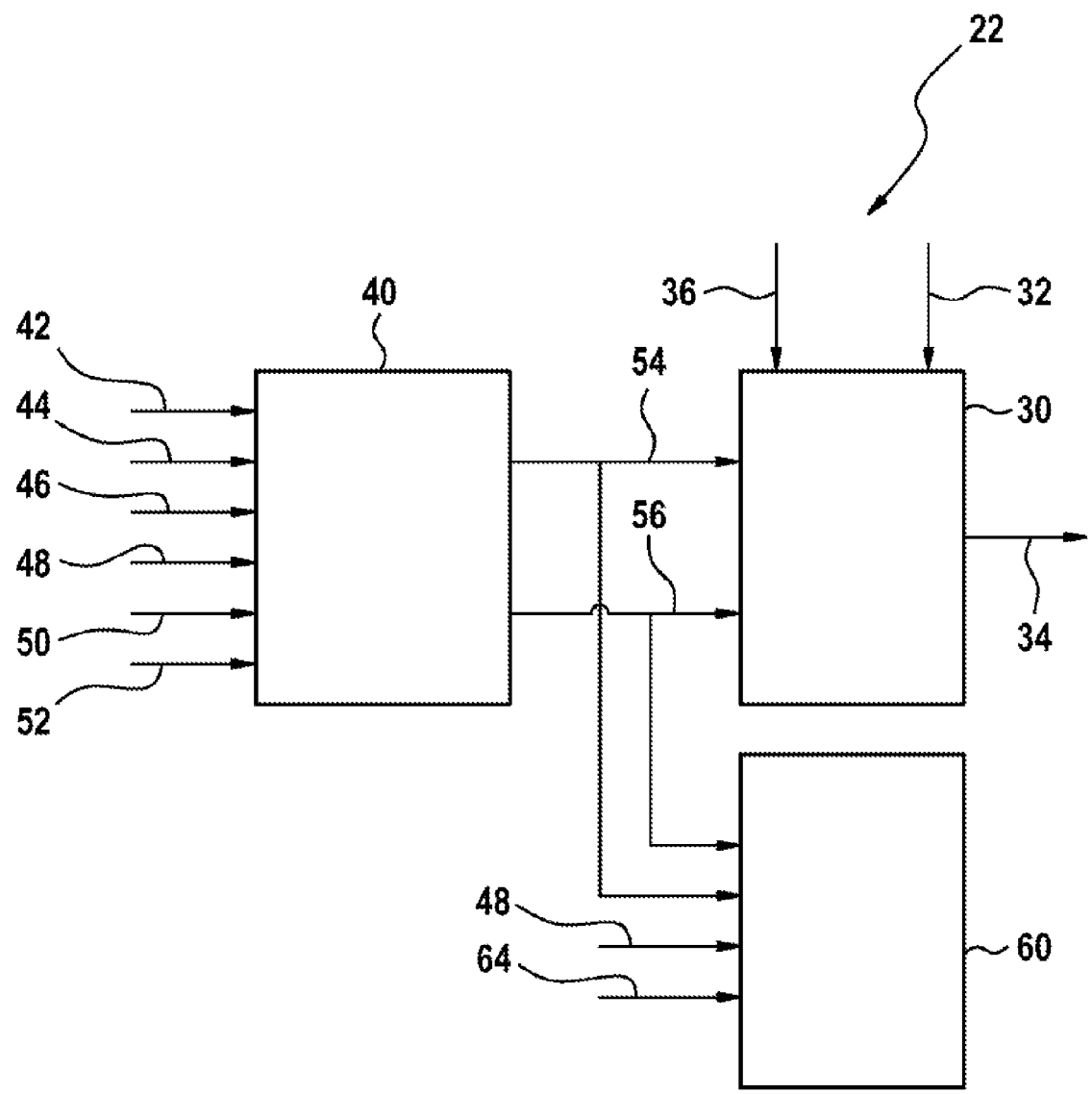
FIG. 2 illustrates schematically a block diagram of a part of a control device for the electric machine.

FIG. 2 illustrates a block diagram of a part of the control device 22 for controlling the electric machine 14.

The control device 22 comprises a higher-priority controller 30 that receives a desired torque 32 that is predetermined externally. The higher-priority controller 30 uses this to generate an internal desired torque 34 that is supplied by way of example to a closed loop control (that operates by way of example by means of a d-q controller). Moreover, the higher-priority controller 30 receives at 36 a desired mode that determines the type of control that is to be performed. The type of control that is to be performed can be a torque control, a rotation speed control, a voltage control etc. If necessary, it is possible that a control type is not predetermined. In the latter case, the electronic power system does not perform any control, so that particularly the motor mode torque limit and generator mode torque limit are also not calculated and consequently particularly the torque is also not predicted.

Moreover, the control device 22 comprises a block and/or a module 40 for calculating torque limits. The torque limit calculating module 40 calculates these torque limits with reference to prevailing parameters including battery current limits 42, battery voltage limits 44, a temperature 46 of the AC converter 18, the rotation speed n, 48, a temperature 50 of the electric machine 14 and/or with reference to replacement diagnostic functions 52.

The torque limit calculating module 40 uses said torque limits to determine a prevailing maximum torque limit 54 and if necessary a minimum torque limit 56. In particular, the calculating module comprises means that mirror-image a section of the first and the second section of the maximum torque limits 54 or rather of the minimum torque limit 56 by means of point mirror-imaging with respect to the origin of the characteristic curve in the quadrants of the other section. As a function of the quadrant in which the control process is currently taking place, either a motor mode or a generator mode limit torque is mapped out on a minimum torque limit 56 of this type; it is exactly the opposite in the case of the maximum torque limit 54. The two limits 54, 56 represent a control range in which the electronic power system 18 can operate. The torque limits 54, 56 are also involved in predicting the torques. The torque limits 54, 56 are input into the higher-priority controller 30. The desired torque 32 that is predetermined externally and input into the higher-priority controller 30 is compared with at least the maximum torque limit 54. Insofar as the desired torque 32 that is predetermined externally is lower than the maximum torque limit 54, the desired torque 32 that is predetermined externally is output as an internal desired torque 34. On the other hand, in the event that the desired torque 32 that is predetermined externally is greater than the maximum torque limit 54, the internal desired torque 34 is reduced to the corresponding value of the maximum torque limit 54.

Moreover, the torque limits 54, 56 are input into a module 60 for predicting the torque. Moreover, this torque prediction module 60 receives the prevailing rotation speed n, 48 and also the battery prediction values 64. The values that are determined in the torque prediction module 60 are input into the torque strategy of the vehicle control.

Figure 3:
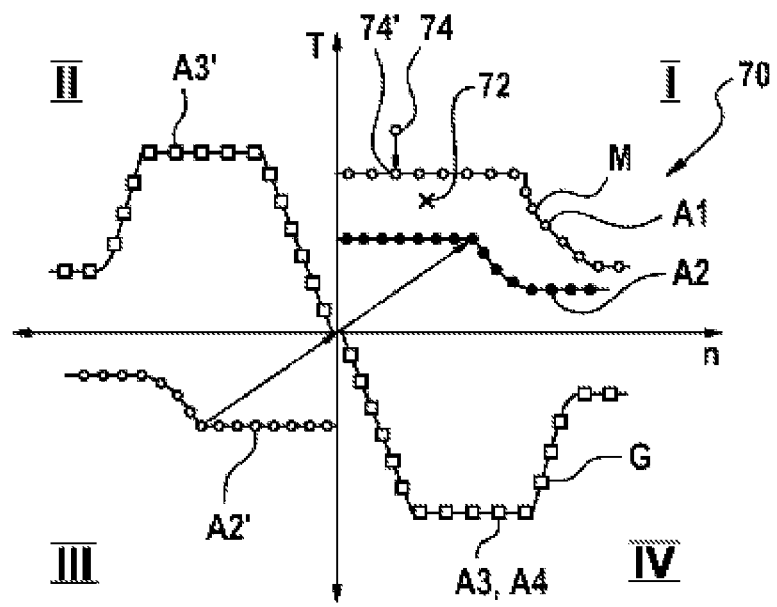
FIG. 3 illustrates schematically a graph with a limit torque characteristic curve.

FIG. 3 illustrates a graph 70 that plots the torque T over the rotation speed n. The graph 70 comprises four quadrants I to IV. Moreover, a characteristic curve M for a motor mode limit torque and a characteristic curve G for a generator mode limit torque are plotted in the diagram 70.

The motor operation is normally performed in the quadrants I, III, whereas the generator operation is imaged by the quadrants II, IV. As a result, the characteristic curve M for positive rotation speeds n comprises a section A1 in the quadrant I. Moreover, in the prior art, the characteristic M comprises a section A2' for negative rotation speeds in the quadrant III. In this case, the section A2' is mirror-imaged by means of point mirror-imaging (as is indicated by the arrows) to A2 in the first quadrant I. As a result, the characteristic curve M for negative rotation speeds comprises a section A2 in the first quadrant I.

The generator characteristic curve G comprises a section A4 for positive rotation speeds in the fourth quadrant. Moreover, in the prior art, the generator characteristic curve G comprises a section A3' in the second quadrant. In this case, the section A3' is mirror-imaged by means of point mirror-imaging to A3 in the fourth quadrant IV. Since the sections A4, A3' are point symmetric, the generator characteristic curve G in this case comprises a section A4 for positive rotation speeds and also a section A3 for negative rotation speeds that are however identical in this case.

A first exemplary desired torque value that is predetermined externally is plotted at 72 in FIG. 3. The section A1 of the motor characteristic curve M can be used in the event that the electric machine is being operated in the motor mode at positive rotation speeds. The desired torque value 72 is below the limit torque that applies for the respective rotation speed so that the desired torque value 72 that is predetermined externally can be directed onwards as the internal desired torque 34.

On the other hand, 74 illustrates a desired torque value that is greater than the limit torque, so that a value 74' corresponding to the limit torque that is allocated to the respective rotation speed is output as the internal desired torque.

Figure 4:
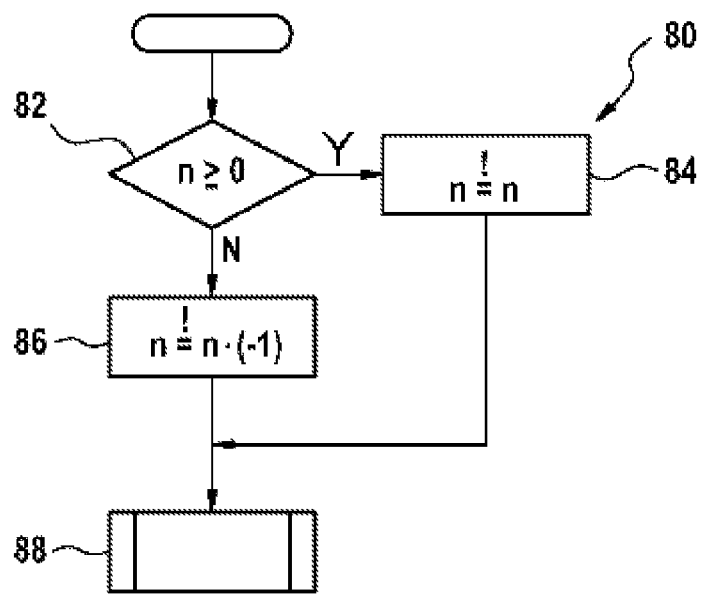
FIG. 4 illustrates schematically a part of a flow chart of the method in accordance with the invention.

FIG. 4 illustrates a block diagram 80 of a routine that is performed prior to performing the check with the aid of the respective characteristic curve M, G. In a query routine 82, a check is initially performed as to whether the rotation speed n≥0. If this is the case, the algebraic sign of the rotation speed is confirmed in block 84. If the result of the query in block 82 is negative, the rotation speed is multiplied by (−1), and in fact in block 86, so that the rotation speed is positive. As a consequence, a comparison is performed with the torque limit in the quadrant I, IV for positive rotation speeds n and in fact within the scope of a check routine 88 that is indicated in FIG. 4.

The invention claimed is:

1. A method for controlling an electric machine for a drive train of a motor vehicle, wherein the electric machine can provide a torque both at positive and also at negative rotation speeds, the method comprising:
   performing a checking procedure with the aid of a characteristic curve as to whether a desired torque value can be provided by the electric machine, wherein the characteristic curve represents a limit torque with respect to the rotation speed and comprises a first section for positive rotation speeds and a second section for negative rotation speeds,
   the first section and the second section being arranged in the same quadrant of a graph;
   controlling the torque output by the electric machine and provided from the drive train to wheels so that the torque does not exceed the limit torque for the rotation speed; and
   during the procedure of starting up the electric machine from the rotation speed of zero, initially the particular section of the characteristic curve that has a lower limit torque in a start-up range is used in the checking procedure irrespective of an algebraic sign of the rotation speed.

2. The method as claimed in claim 1, wherein one section of the first section and of the second section of the characteristic curve is mirror-imaged by point mirror-imaging with respect to the origin of the characteristic curve in the quadrant of the other section.

3. The method as claimed in claim 1, wherein the torque is a motor mode torque and the second section for negative rotation speeds is arranged in the quadrant for positive rotation speeds.

4. The method as claimed in claim 1, wherein the torque is a generator mode torque and the second section for negative rotation speeds is arranged in the quadrant for positive rotation speeds.

5. The method as claimed in claim 1, wherein the rotation speed, when having a negative value, is subjected to an algebraic sign change prior to performing the checking procedure.

6. The method as claimed in claim 1, wherein the limit torque is adjusted in dependence upon one or several of the following parameters including battery current limits, battery voltage limits, temperature of an AC converter, rotation speed, temperature of the electric machine and replacement diagnostic functions.

7. The method as claimed in claim 1, wherein the same quadrant is quadrant I of the graph, and wherein the torque is a motor mode torque and the second section for negative rotation speeds is arranged in the quadrant I for positive rotation speeds.

8. The method as claimed in claim 1, wherein the same quadrant is quadrant IV of the graph, and wherein the torque is a generator mode torque and the second section for negative rotation speeds is arranged in the quadrant IV for positive rotation speeds.

9. The method as claimed in claim 1, wherein the limit torque is adjusted in dependence upon battery voltage limits, rotation speed, and one or more parameters from the group consisting of battery current limits, temperature of an AC converter, temperature of the electric machine and replacement diagnostic functions.

10. A method for controlling an electric machine for a drive train of a motor vehicle, wherein the electric machine can provide a torque both at positive and also at negative rotation speeds, the method comprising:
performing a checking procedure with the aid of a characteristic curve as to whether a desired torque value can be provided by the electric machine, wherein the characteristic curve represents a limit torque with respect to the rotation speed and comprises a first section for positive rotation speeds and a second section for negative rotation speeds,
the first section and the second section being arranged in the same quadrant of a graph; and
controlling the torque output by the electric machine and provided from the drive train to wheels so that the torque does not exceed the limit torque for the rotation speed,
wherein the characteristic curve of the first section for positive rotation speeds is non-symmetrical with the characteristic curve of the second section for negative rotation speeds.

11. The method as claimed in claim 1, including point-mirror imaging the second section of the characteristic curve onto the quadrant of the first section of the characteristic curve.

12. A control device for an electric machine for a drive train of a motor vehicle, wherein the electric machine can provide a torque both at positive and also at negative rotation speeds, and wherein the control device configured to:
perform a checking procedure with the aid of a characteristic curve as to whether a desired torque value can be provided by the electric machine, wherein the characteristic curve represents a limit torque with respect to the rotation speed and comprises a first section for positive rotation speeds and a second section for negative rotation speeds, the first section and the second section being arranged in the same quadrant of a graph;
control the torque output by the electric machine and provided from the drive train to wheels so that the torque does not exceed the limit torque for the rotation speed; and
during the procedure of starting up the electric machine from the rotation speed of zero, initially the particular section of the characteristic curve that has a lower limit torque in a start-up range is used in the checking procedure irrespective of an algebraic sign of the rotation speed.

13. A drive train for a motor vehicle having an electric machine including a control device, wherein the electric machine can provide a torque both at positive and also at negative rotation speeds, and wherein the control device is configured to:
perform a checking procedure with the aid of a characteristic curve as to whether a desired torque value can be provided by the electric machine, wherein the characteristic curve represents a limit torque with respect to the rotation speed and comprises a first section for positive rotation speeds and a second section for negative rotation speeds, the first section and the second section being arranged in the same quadrant of a graph;
control the torque output by the electric machine and provided form the drive train to wheels so that the torque does not exceed the limit torque for the rotation speed; and
during the procedure of starting up the electric machine from the rotation speed of zero, initially the particular section of the characteristic curve that has a lower limit torque in a start-up range is used in the checking procedure irrespective of an algebraic sign of the rotation speed.

* * * * *